Dec. 28, 1954  W. H. GILLE  2,698,148
AUTOMATIC PILOT APPARATUS FOR AIRCRAFT
Filed Nov. 10, 1952
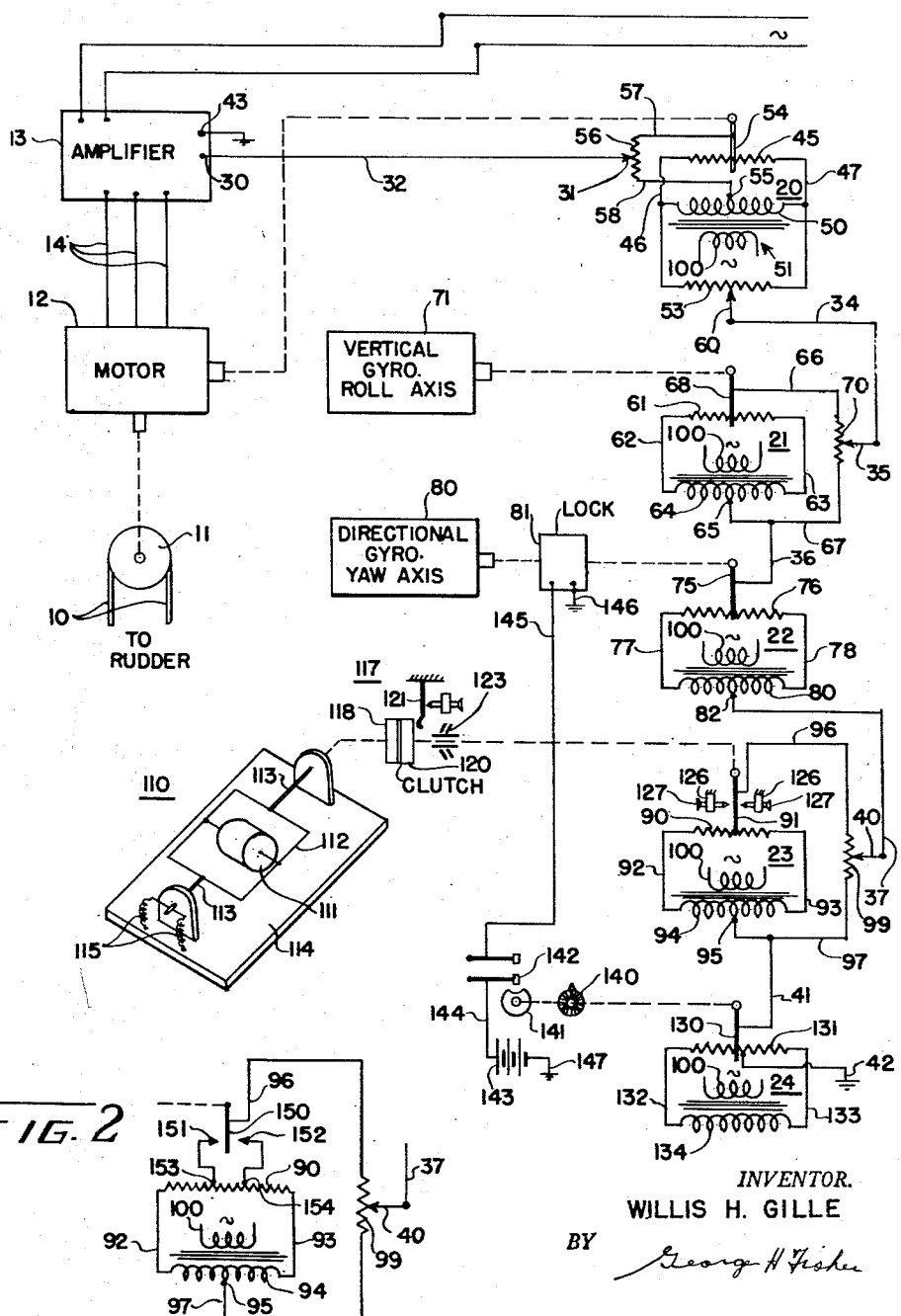
INVENTOR.
WILLIS H. GILLE
BY George H Fisher
ATTORNEY

United States Patent Office 2,698,148
Patented Dec. 28, 1954

2,698,148

AUTOMATIC PILOT APPARATUS FOR AIRCRAFT

Willis H. Gille, St. Paul, Minn., assignor to Minneapolis-Honeywell Regulator Company, Minneapolis, Minn., a corporation of Delaware Application November 10, 1952, Serial No. 319,694

9 Claims. (Cl. 244—77)

This invention concerns an improved flight control system or apparatus for aircraft.

At the present time many aircraft are provided with automatic flight control apparatus. For the most part, such apparatus provides deviation responsive means which control servomotors that actuate the control surfaces of the aircraft to maintain the aircraft in desired attitudes and on desired headings. The control of the heading of an aircraft is primarily governed by a deviation responsive device sensing azimuth displacement, such as a directional gyroscope, inasmuch as such devices have the tendency of maintaining one of its displacement axes fixed in direction. In certain instances rate of deviation sensing devices are employed, particularly in the azimuth axis for the purpose of stabilizing the control apparatus flight of the aircraft as well as increasing the rate of response of the control apparatus to aircraft displacement. The patent of Robert J. Kutzler No. 2,561,873, dated July 24, 1951, discloses such a flight control system.

With the increase in physical size of the aircraft, certain flight characteristics have arisen which have given rise to the need for still further stability in aircraft flight. Due to structural elasticity of the fuselage, the length of the control cables operating the control surfaces such as the rudder and elevators, and because of an inherent time lag in the mechanical as well as electrical control apparatus, large aircraft are often known to have a vibration or oscillation in the tail section independent of the normal oscillation of the entire fuselage which is generally called tail flutter. Tail flutter appears to be most critical in the plane of operation of the rudder control effecting oscillation in the craft about the yaw displacement axis. It is this difficulty in aircraft operation that the subject improvement in aircraft control apparatus overcomes. By leading or anticipating the oscillation of the aircraft about the yaw axis, with a signal to the servomotor which actuates the rudder, it has been found that such undesirable oscillation can be successfully damped to a point where it is no longer present or objectionable. My copending application on Automatic Pilots, Serial No. 319,716 filed November 10, 1952, discloses an apparatus for overcoming this deleterious aircraft operation. My present invention provides an improved apparatus in which this lead signal is introduced into the flight control apparatus by means of a device sensing rate of displacement of the aircraft about the yaw axis, namely a rate gyroscope, and it is introduced into the flight control apparatus upon a decrease in the rate of displacement of the aircraft about the yaw displacement axis to give an anticipation of the next oscillation of the tail or rudder and vertical stabilizer of the aircraft to stabilize the tail flutter or undesirable oscillation. In the initial displacement of the aircraft about the yaw axis, the rate sensor or rate gyroscope operates to give a conventional signal to the flight control apparatus to effect the conventional operation of the rudder servomotor such that it will tend to move the rudder in a direction to recover from the displacement. Therefore, it is an object of this invention to provide an improved flight control apparatus for an aircraft in which lead or anticipating signals are provided from an improved rate sensing device to stabilize and overcome undesirable oscillations in the aircraft.

Another object of this invention is to provide an automatic flight control apparatus utilizing an improved rate sensor for stabilizing the aircraft against deleterious oscillation about any of its displacement axes.

A further object of this invention is to provide in an improved flight control apparatus for aircraft a rate gyroscope designed to introduce leading or anticipating signals into the control apparatus for the purpose of damping deleterious oscillation of the aircraft.

A still further object of this invention is to provide an improved rate gyroscope device for producing lead signals.

These and other objects of this invention will become apparent from a reading of the attached description together with the drawings in which Figure 1 is a schematic view of a portion of the flight control apparatus, and Figure 2 is a schematic view of another embodiment of a signal producing device.

This invention is concerned primarily with the control of the aircraft with respect to its azimuth axis or with respect to the control of the rudder surface of an aircraft inasmuch as it is about this axis that such oscillation as tail flutter generally takes place. It will be recognized, however, that the inventive concept herein may be applied equally well to the control of any and all of the flight control surfaces of the aircraft should such oscillation be present with respect to the other aircraft displacement axes. For this reason, the subject invention is shown only in conjunction with the rudder portion or channel of a flight control apparatus of the type found in the above named Kutzler patent to which reference should be made for a complete flight control system.

The control of the aircraft with respect to the yaw or turn axis is effected by the operation of the rudder (not shown) and also the ailerons (not shown), reference to the latter being completely omitted. The rudder is operated by means of cables 10 which lead from the cable drum 11 and is driven by a motor indicated schematically as 12. Motor 12 can be of any conventional type capable of reversible output or control through the operation of an amplifier. Motor 12 as shown herein is connected to an amplifier 13 through leads indicated at 14. Amplifier 13 may also be of any conventional type having an A. C. supply and suitable for supplying an output circuit with a voltage the phase relationship of which with respect to a standard source of power is dependent upon and reversible with a signal voltage supplied to the amplifier. Reference should be made to the Upton Patent No. 2,423,534 issued July 8, 1947, where a disclosure of such an amplifier and motor means is made.

A signal for controlling amplifier 13 is derived from several series connected impedance networks 20, 21, 22, 23 and 24. The signal circuit for the amplifier 13 extends from input terminal 30 of the amplifier to a wiper 31 through a conductor 32 to network 20, conductor 34, to wiper 35, network 21, conductor 36, network 22, conductor 37, to wiper 40, network 23, conductor 41, network 24, to a ground connection 42 of the network 24, and to grounded input terminal 43 of amplifier 13.

Impedance network 20 is in the form of a Wheatstone bridge two legs of which are formed by a resistor 45 having its extremities connected through leads or conductors 46 and 47 to the extremities of a secondary winding 50 of a transformer 51, the primary winding of which is indicated by reference numeral 100. Since in all of the impedance networks the secondaries may have a common primary, the primaries of the energizing transformers of the several impedance networks are indicated by the same reference character 100. This primary 100 may be connected to an inverter, not shown, which forms a source of supply for the primaries. The other legs of bridge or network 20 are formed by the resistor 53 whose extremities are attached also to the secondary winding 50 by conductors 46, 47. Resistor 45 has a wiper 54 associated therewith, the two elements forming a potentiometer which will hereafter be referred to as the servo balance potentiometer inasmuch as the wiper 54 thereof is mechanically connected to the output shaft motor 12. Connected between wiper 54 and a center tap 55 of secondary winding 50 of transformer 51, is a resistor 56, the extremities of the resistor 56 being connected to said elements by conductors 57 and 58. Resistor 56 and wiper 31 constitute a potentiometer positioned between the wiper 54 and the transformer secondary 50 being energized in proportion to the displacement of the wiper 54 along the winding 45. As explained in the before mentioned Kutzler application, this potentiometer constitutes a ratio potentiometer to determine the relative movement between the wipers 54 and the center tap 55 of transformer secondary 50 sufficient to balance the bridge circuit. Resistor 53 has a wiper 60 which connects to conductor 34, associated therewith, these elements forming a potentiometer which will hereafter be referred to as the centering potentiometer indicating the function that this element performs. Normally this potentiometer is adjusted initially to establish a normal trim position for the rudder or the associated servomotor and when adjusted is not thereafter moved since it defines a reference position with respect to the wiper 54 for balancing the bridge 20. The bridge 20 is connected at wiper 60 and through the conductor 34 to the bridge 21, which bridge consists of a resistor 61 connected through conductors 62, 63 to the extremities of a secondary winding 64 of a transformer which also has the common primary 100. Connected between the wiper 61 and a center tap 65 of the secondary winding 64 through conductors 66, 67 is a resistor 70 whose wiper 35 is connected to the conductor 34. Wiper 68 and resistor 61 form a potentiometer which is operated through displacement of a vertical gyroscope indicated schematically at 71 upon displacement of the vertical gyroscope about its roll axis. The wiper 68 is operatively connected to the roll axis of the vertical gyroscope 71 and when displaced due to the movement of the vertical gyroscope about this axis will cause the bridge 21 to produce a signal output in proportion to the displacement between the wiper 68 and the center tap 65 of secondary winding 64 of the transformer which output will be impressed across the potentiometer formed by the resistor 70 and the wiper 35. It will be evident that this last named potentiometer serves merely to vary the proportion of this vertical gyro roll axis signal to the network circuit for controlling the motor 12.

The conductor 36 which connects network 21 to network 22 is connected to a wiper 75 which cooperates with a resistor 76, the extremities of which are connected by conductors 77, 78 to a secondary winding 80 of a transformer also having the primary source 100. Wiper 75 and resistor 76 form a potentiometer which will hereafter be referred to as the directional gyroscope potentiometer. The wiper 75 is operated through displacement of the directional gyroscope 80 about its yaw axis through a directional arm lock 81 of the type shown in my application, Serial No. 447,989, filed June 22, 1942. The driving connection between the arm or output shaft of the gyroscope of the wiper 75 may include a frictional clutch which is not shown. The lock 81 when actuated serves to hold one side of the frictional clutch but permits the other side to move under the action of the gyroscope. The directional arm lock is controlled through an energizing circuit which will be later described. Bridge 22 provides a signal to the motor 12 in proportion to the displacement of the wiper 75 along resistor 74 and away from a point of equal potential of a center tap 82 of the secondary winding 80 of an energizing transformer for the directional gyro potentiometer. The full voltage or signal from this bridge is applied directly to the network. The conductor 37 which connects the bridge 22 and the bridge 23 is attached to the tap 82 of the secondary winding 80 of the transformer energizing the bridge 22. Bridge or network 23 consists of a resistor 90 and an associated wiper 91, the resistor being connected by conductors 92, 93 to a secondary winding 94 of a transformer which has a common primary 100. Attached between wiper 91 and a tap 95 of a secondary winding 94 by leads 96, 97 is a resistor 99 which cooperates with a wiper 40 attached to conductor 37. The wiper 91 is operated from the displacement axis of a rate gyroscope indicated schematically at 110 which is so mounted on the aircraft to sense rate of displacement about the yaw axis thereof. The rate gyroscope is largely conventional employing a rotor mass 111 journaled on a rotor mounting ring 112 which, in turn, is journaled through shafts 113 to a support structure 114. Shafts 113 form a displacement axis for the gyroscope about which a pair of springs or biasing means indicated schematically at 115 are designed to restrain movement in a conventional manner. Springs 115 are shown herein schematically as connected to the extension of one of the shafts or journals 113 and attached to the frame 114 of the gyroscope. An extension of the shaft or shafts 113 leads to a clutch indicated at 117 having a pair of clutch members 118 and 120 biased together by any suitable means such as an adjustable spring indicated at 121. While the disclosure herein is schematic, it is to be understood that one clutch member 118 would be so mounted on shaft 113 as to rotate therewith and the other clutch member 120 would be suitably journaled on a support 114 such as is schematically indicated at 123 to be in a slip friction association with the member 118. The clutch member 120 carries the wiper 91 of the rate gyroscope potentiometer such that it will move with the clutch member 118 and the rotor mounting ring 112 as it is displaced about its axis formed by the journals 113 except when the clutch members are caused to slip relative to one another. Also, forming a part of the clutch assembly a pair of stop members indicated schematically at 126 in the drawings and designed to cooperate with the wiper 91 to limit displacement thereof along the resistor 90. The stop members have suitable adjusting means 127 and are normally mounted on the support 114 of the gyroscope as is the resistor 90 and wiper 91, being electrically insulated therefrom. It will be seen that the stop members may be adjusted such that the wiper 91 will, when displaced by the gyroscope through the clutch, be engaged by the wiper to cause an arresting movement of the wipers because of the slip friction association of the clutch members 120 and 118. The differential or allowable travel between the stop members 126 is made relatively small compared to the possible displacement of the gyroscope about its displacement axis and consequently the wiper will normally engage the stop members during the initial stage of operation of the rate gyroscope or at a relatively low rate of displacement of the gyroscope at which point the wiper will remain fixed relative to the resistor 90 and the gyroscope will continue to be displaced about its axis. As the rate of displacement of the gyroscope begins to decrease, the springs will tend to center the rotor mounting gimbal 112 with respect to the support and will cause the clutch member 120 to drive the wiper 91 in an opposite direction toward the opposite stop member 126. It will be understood that the relationship between the tap 95 of secondary 94 and the wiper 91 on the resistor 90 will determine the phase or sense of the output signal of this bridge and it will be seen that upon decrease in rate of displacement of the gyroscope, that the sense of the output signal from the rate gyro signalling device or potentiometer will be reversed inasmuch as the stops 126 are positioned with respect to the winding or resistor 90 to be on either side of the potential location of the center tap 95. As will be later pointed out this introduces a lead signal into the network supplying the amplifier 13 to control the energization of the motor. It will further be seen that the potentiometer formed by the resistor 99 and the wiper 40 will determine what portion of this signal will be applied to the networks in the series connection. The bridge 23 is connected to the bridge 24 by the conductor 41 which is connected to the tap 95 of winding 94 and in turn to a wiper 130 associated with a resistor 131 of the network 24. The resistor 131 is connected at its extremities by conductors 132 and 133 to a secondary winding 134 of a transformer which has the common primary source 100. The resistor 131 carries the grounded center tap 42 which completes the network circuit to the amplifier 31. The wiper 130 is operated by a manual control indicated schematically at 140 to move the wiper 130 relative to the resistor 131. This last named combination forms the potentiometer which will be referred to as the turn potentiometer. Also connected to the manual knob 140 is a cam 141 which operates a pair of contacts 142 to control a source of D. C. power indicated at 143 to the directional arm lock 81 of the directional gyroscope 80. The battery supply 143 is connected through the contacts 142 by conductor 144 and by a conductor 145 to the directional arm lock 81. The circuit is completed through a ground connection 146 on the lock 81 to the grounded terminal 147 of the supply 143. It will be seen that operation of manual control 140 will cause the contacts 142 to close energizing the lock and eliminating the directional gyroscope potentiometer from the amplifier control circuit since the latter will remain in a centered relationship. Thus, when the manual control 140 is operated to introduce a signal to the motor and amplifier through the network 24, the signal which would normally be supplied to the directional gyroscope control bridge 22 will be in effect eliminated from the circuit inasmuch as the wiper 75 will be centered with respect to the center tap 82 of the transformer winding 80 and no voltage drop or output will occur across this bridge network.

The operation of the subject control apparatus can best be explained by referring first to the above named Kutzler patent which shows substantially the same control apparatus for the rudder channel of the aircraft with the exception that it employs a conventional rate gyroscope. It will be understood that while the present disclosure relates only to the rudder channel or the network supplying the amplifier which controls the rudder servomotor, that the sensing devices, namely the vertical gyroscope 71, the directional gyroscope 80 and the turn control 140 operate also in the aileron channel of the aircraft. Under purely automatic operation and considering only the rudder channel, it will be seen that the network will normally be balanced with all of the wipers of the signal potentiometers or signal producing devices of the networks adjusted in a central position and with the rudder control in a streamlined position. Displacement of the aircraft in its yaw axis will result initially in displacement of the directional gyroscope about that axis as well as the rate gyroscope and consequently will cause moving of the respective potentiometer wipers relative to the resistance windings to unbalance the bridges 22 and 23. This unbalance will send a signal to the amplifier 13 causing the motor to operate in such a direction as to return the aircraft to the predetermined position or heading for which the directional gyroscope was set. Operation of the servomotor will unbalance the bridge 20 as the servomotor potentiometer wiper is displaced tending to balance the signals going to the amplifier 13. The rate sensing device will respond initially at a rate depending upon the rate of displacement of the aircraft and its function in the control apparatus is primarily to increase the rate of response of the control system. The vertical gyroscope potentiometer or signal device is included in this channel primarily to coordinate operation of rudder and aileron in turns and to utilize the rudder channel for recovery of the displacement of the aircraft about the roll axis. It will also be evident that whenever the aircraft is to be turned or steered through the manual control, the directional gyroscope will be locked out and the signal introduced to control the rudder from the sensing bridge 24.

The purpose of the subject invention is to introduce a lead signal into an autopilot or flight control apparatus for the purpose of overcoming or damping oscillations about the yaw axis of the aircraft. It will be seen that upon displacement of the aircraft about this axis that the rate gyroscope responds initially in the manner referred to in the Kutzler patent, that is, to introduce a signal in proportion to the rate at which the displacement takes place about the yaw axis for the purpose of aiding recovery. It will be seen, however, that the displacement of the rate gyro potentiometer is quite limited due to the stops 126 and consequently there is an upper limit of the magnitude of the rate gyroscope signal which can be introduced into the network. For this reason some of the sensitivity of the control apparatus and the rapid responses due to rapid displacement of the aircraft may be sacrificed in order that a lead signal may be obtained from the rate gyroscope device. It will be recognized, however, that if the sensitivity is required that a second rate gyroscope may be employed to serve this function. As rate of displacement of the aircraft increases, the wiper 91 will engage one or the other of the stops 126 depending upon the direction of displacement of the aircraft causing the wiper to be stopped on the resistance 90 while the gyroscope is further displaced about its displacement axis due to the slip friction connection between the rate gyroscope and its potentiometer wiper 91 depending upon the rate of the aircraft displacement. Upon a decrease in the rate of displacement, the gyroscope will move toward a centered position and the clutch will cause the wiper to be rotated in the opposite direction toward the opposite stop member causing a signal of the opposite sense to be introduced into the network which considered by itself would be in a direction to cause a servomotor to rotate the rudder and hence displace the aircraft back toward the position from which the aircraft is then recovering. It will be understood, however, that the magnitude of this signal is not sufficient to so control the servomotor inasmuch as the servo balance potentiometer, the vertical gyroscope potentiometer, and the directional gyroscope potentiometer will also have inserted signals into the amplifier. The effect of this lead signal, however, will be such as to modify the position of the rudder such as to anticipate or tend to damp the oscillation of the rudder control surface. It will also be evident that as the rate gyroscope moves from a position of displacement in one direction to a position of displacement in the other direction indicating a decrease in acceleration or rate of turning to an increase in rate of turning in the opposite direction, that the wiper 91 will remain against the stop 126 against which it is urged as the decrease in rate of the displacement occurs. Therefore, once recovery is made from a turn in one direction and a turn is started in the opposite direction, the operation of the rate gyroscope will be initially as it is described in connection with the Kutzler application. It will also be evident that the potentiometer formed by the resistor 99 and wiper 40 controls the level of the displacement signal of the bridge 23 which is to be connected to the amplifier 13 or in series with the remaining bridge elements. Under certain conditions it may be advisable to eliminate the rate gyroscope from the control apparatus because of the lead signal to be introduced therefrom. For example, under take-off conditions where such tail oscillation is not of serious consequence or prominence, the potentiometer may be adjusted so that the wiper 40 approaches the end of the resistor 99 common to the tap 95 of the transformer secondary 94. This would operate in effect to eliminate the bridge 23 from the network. Once take-off has been completed, the potentiometer wiper could be adjusted to a point on the resistance such that a desirable level of control might be obtained from the bridge 23. Such operation would only be necessary under circumstances where positive rudder control is required on take-off and where it is felt that the output of the bridge 23 might tend to dampen rudder movement to such a degree that it would tend to diminish the effectiveness of the rudder control.

In Figure 2 is shown another embodiment of the signal producing device or potentiometer which could be operated by the rate gyroscope 110. It is to be understood that the rate gyroscope would be unmodified with the exception that the wiper 91 would be replaced by movable contact 150 which would be attached to the clutch member 120 of clutch 117 and which would cooperate with a pair of stationary contacts 151 and 152 attached respectively to taps 153 and 154 on the resistor 90. Bridge 23 so modified would be energized by the secondary winding 94 of the transformer and would be connected by conductors 96 and 97 to a potentiometer winding 99. Further, it will be understood that the tapped secondary 95 is connected to conductor 41 to complete the connections to the remaining parts of the network. This embodiment is substantially the same as that of Figure 1 with the exception that the voltage output from the bridge 23 is not varied by virtue of the wiper 91 travelling across the resistor 90 but rather by virtue of the contact made by the movable element 150 with one or the other of the stationary elements 151, 152 to taps 153 or 154 on the resistor winding, the taps being located to either side of a voltage position having a potential equal to that of the tap 95 of the secondary winding. It therefore will be recognized that operation of the contact device will provide for the introduction of a rate signal to the network in a single step of voltage change and the operation of the gyroscope 110 will change the signal output of the bridge from a voltage of one magnitude and one sense to one of a similar magnitude but opposite sense as one or the other of the relay contacts are made. This arrangement merely eliminates the gradual change of potential due to the movement of the wiper over the resistance winding of the potentiometer. It will further be understood that the taps could be adjusted at any spacing to either side of the neutral position on the resistance winding 90 while at the same time the spacing or displacement between the fixed contacts can be held down to a very small amount of travel thereby providing for substantially large voltage increments or power signals from the rate gyroscope network for small displacements of a rate gyroscope. This arrangement may utilize the stationary contacts as the stop members or, if desired, the stop members 126 and their adjustment features 127 may be included in this embodiment. The operation of this embodiment and the remaining portion of the system is the same as that described in connection with the before mentioned embodiment.

While I have described my invention in connection with the rudder channel of an autopilot control system or flight control apparatus, it will be understood that the same principle may be applied to any other control channel of a flight control apparatus wherein it is desired to dampen deleterious oscillations of an aircraft. Further, it will be recognized that changes may be made in the parts and circuitry of this disclosure without departing from the teaching of the subject invention. Therefore, the scope of the invention is to be determined only by the appended claims.

I claim as my invention:

1. Control apparatus for controlling the position of a flight control surface of an aircraft to control displacement of said aircraft about a predetermined axis, comprising, a control surface motor means, amplifier means for controlling the operation of said motor means, a plurality of adjustable signal producing devices, means sensing displacement of said aircraft from a predetermined position about said predetermined axis and connected to one of said signal producing devices to produce a signal of a sense which when impressed on said amplifier means causes said motor means to position said control surface in such a manner as to cause said aircraft to return to said predetermined position, and means sensing rate at which the attitude of the aircraft changes about said predetermined axis and operating a second of said signal producing devices, means connecting said second signal producing device to said rate sensing device in such a manner that the signal produced thereby will have a sense opposite to that produced by said first signal producing device for the same direction of displacement of said aircraft about said predetermined axis as said rate of attitude change of said aircraft starts to decrease at a point of wide displacement of said aircraft about said axis and a signal of the same sense as that produced by the first signal producing device as said rate of change of attitude starts to decrease at a point of small displacement of said aircraft about said axis, and means for combining the signals from all of said devices and connecting them to said amplifier means.

2. Control apparatus for controlling the position of a flight control surface of an aircraft to control displacement of said aircraft about a predetermined axis, comprising, a control surface motor means, amplifier means for controlling the operation of said motor means, a plurality of adjustable signal producing devices, means sensing displacement of said aircraft from a predetermined position about said predetermined axis and connected to one of said signal producing devices to produce a signal of a sense which when impressed on said amplifier means causes said motor means to position said control surface in such a manner as to cause said aircraft to return to said predetermined position, and means sensing rate at which the attitude of the aircraft changes about said predetermined axis and operating a second of said signal producing devices, means connecting said second signal producing device to said rate sensing device in such a manner that the signal produced thereby will have a sense opposite to that produced by said first signal producing device for the same direction of displacement of said aircraft about said predetermined axis as said rate of change of attitude of said aircraft starts to decrease at a point of wide displacement of said aircraft about said axis and signal of the same sense as that produced by the first signal producing device as said rate of change of attitude starts to decrease at a point of small displacement of said aircraft about said axis, means for combining the signals from all of said devices and connecting them to said amplifier means, and means for selectively varying the magnitude of the signal from said second named signal producing device to be impressed on said amplifier means.

3. Control apparatus for controlling the position of a flight control surface of an aircraft to control displacement of said aircraft about a predetermined axis, comprising, a control surface motor means, amplifier means for controlling the operation of said motor means, a plurality of adjustable signal producing devices, means sensing displacement of said aircraft from a predetermined position about said predetermined axis and connected to one of said signal producing devices to produce a signal of a sense which when impressed on said amplifier means causes said motor means to position said control surface in such a manner as to cause said aircraft to return to said predetermined position, and means sensing rate at which the attitude of the aircraft changes about said predetermined axis and operating another of said signal producing devices, means including a slip friction clutch connecting said second named signal producing device to said rate sensing device in such a manner that the signal produced thereby will have a sense opposite to that produced by said first named signal producing device for the same direction of displacement of said aircraft about said predetermined axis as said rate of change of attitude of said aircraft starts to decrease, and means for combining the signals from all of said devices and connecting them to said amplifier means.

4. Control apparatus for controlling the position of a flight control surface of an aircraft to control displacement of said aircraft about a predetermined axis, comprising, a control surface motor means, amplifier means for controlling the operation of said motor means, a plurality of adjustable signal producing devices, means sensing displacement of said aircraft from a predetermined position about said predetermined axis and connected to one of said signal producing devices to produce a signal of a sense which when impressed on said amplifier means causes said motor means to position said control surface in such a manner as to cause said aircraft to return to said predetermined position, and means sensing rate at which the attitude of the aircraft changes about said predetermined axis and operating a second of said signal producing devices, means connecting said second signal producing device to said rate sensing device including a slip friction connection between said devices and stop means on said signal producing device for limiting movement of said second signal producing device while permitting movement of said rate sensing means beyond the displacement of said second signal producing device, and means for combining the signals from all of said devices and connecting them to said amplifier means.

5. Control apparatus for controlling the position of a flight surface of an aircraft to control displacement of said aircraft about a predetermined axis, comprising, a control surface motor means, amplifier means for controlling the operation of said motor means, a plurality of adjustable signal producing devices, means sensing displacement of said aircraft from a predetermined position about said predetermined axis and connected to one of said signal producing devices to produce a signal of a sense which when impressed on said amplifier means causes said motor means to position said control surface in such a manner as to cause said aircraft to return to said predetermined position, a rate sensing device having springs for centering said device in a neutral position, said device being adapted to sense rate of displacement of said aircraft about said predetermined axis and operating a second of said signal producing devices, stop means for limiting the displacement of said second signal producing device to a displacement less than the displacement of said rate sensing device, means connecting said rate sensing device to said second named signal producing means to operate said second signal producing device between its stop means and permitting movement of said rate sensing device beyond the limited displacement of said second signal producing device, and means for combining the signals from all of said signal producing devices and connecting them to said amplifier means.

6. In a rate gyroscope, a rotor mass, means mounting said rotor mass such that said mass is adapted to be rotated relative to said mounting means, a support, means journaling said rotor mounting means for displacement relative to said support over a wide angle of displacement, biasing means connected between said support and said rotor mounting means and adapted to restrain said displacement, signal producing means including two relatively movable parts one of which is stationarily mounted on said support, means mounting the other of said parts of said signal producing means on said rotor mounting means in a slip friction type of connection for movement relative to said first named part, and adjustable means mounted on said support and cooperating with the other of said parts to limit relative displacement between said parts of said signal producing means to less than said displacement of said rotor mounting means on said support.

7. In a rate gyroscope, a rotor mass, means mounting said rotor mass such that said mass is adapted to be rotated relative to said mounting means, a support, means journaling said rotor mounting means for displacement relative to said support over a wide angle of displacement, biasing means connected between said support and said rotor mounting means and adapted to restrain said displacement, signal producing means including two relatively movable parts one of which is mounted on said support, a slip friction clutch means including a pair of clutch members one of which is attached to said rotor mounting means and the other journaled on the mounting means in frictional association with the said first named clutch member in a biased relationship, said journaled clutch member mounting the other of said parts in said signal producing means in cooperative relationship with said part of said signal producing means mounted on said support, and adjustable means mounted on said support and co-operating with the other of said parts of said signal producing means to limit relative displacement of said parts of said signal producing means to less than the displacement of said rotor mounting means on said support.

8. In a rate gyroscope, a rotor mass, means mounting said rotor mass such that said mass is adapted to be rotated relative to said mounting means, a support, means journaling said rotor mounting means for displacement relative to said support over a wide angle of displacement, biasing means connected between said support and said rotor mounting means and adapted to restrain said displacement, signal producing means including a potentiometer winding mounted on said support and a wiper associated therewith, a friction clutch including a pair of clutch members one of which is mounted on said rotor mounting means and the other journaled thereon in biased frictional association with said first named clutch member, said journaled clutch member mounting said wiper of said signal producing means in cooperative relationship with said potentiometer winding mounted on said support, and adjustable limit stops mounted on said support and cooperating with said wiper of said signal producing means to limit relative displacement of the parts of said signal producing means to less than the displacement of said rotor mounting means on said support.

9. In a rate gyroscope, a rotor mass, means mounting said rotor mass such that said mass is adapted to be rotated relative to said mounting means, a support, means journaling said rotor mounting means for displacement relative to said support over a wide angle of displacement, biasing means connected between said support and said rotor mounting means and adapted to restrain and said rotor mounting means and adapted to restrain said displacement, biasing means connected between said support and said rotor mounting means and adapted to restrain said displacement, signal producing means including a movable contact and a pair of stationary contacts, a resistance element mounted on said support and adapted to be energized from a source of electrical power, said resistance element having taps thereon connected respectively to said stationary contacts, a friction clutch including a pair of clutch members one of which is mounted on said rotor mounting means and the other journaled thereon in biased frictional association with said first named clutch member, said journaled clutch member mounting said movable contact of said signal producing means in cooperative relationship with said stationary contacts mounted on said support, and adjustable limit stops mounted on said support and cooperating with said movable contact of said signal producing means to limit relative displacement of the parts of said signal producing means to less than the displacement of said rotor mounting means on said support.

References Cited in the file of this patent

UNITED STATES PATENTS

| Number | Name | Date |
| --- | --- | --- |
| 2,290,232 | Fischer | July 21, 1942 |
| 2,464,629 | Young | Mar. 15, 1949 |
| 2,471,821 | Kutzler et al. | May 31, 1949 |
| 2,488,286 | Glenny | Nov. 15, 1949 |
| 2,595,309 | Slater | May 6, 1952 |
| 2,611,559 | Meredith | Sept. 23, 1952 |

FOREIGN PATENTS

| Number | Country | Date |
| --- | --- | --- |
| 506,700 | Germany | Sept. 8, 1930 |